United States Patent
Whitfill et al.

(10) Patent No.: US 6,889,780 B2
(45) Date of Patent: May 10, 2005

(54) METHOD FOR DRILLING DEPLETED SANDS WITH MINIMAL DRILLING FLUID LOSS

(75) Inventors: Donald L. Whitfill, Kingwood, TX (US); Kenneth W. Pober, Houston, TX (US); Thomas R. Carlson, Humble, TX (US); Uday A. Tare, Houston, TX (US); James V. Fisk, Houston, TX (US); Joe L. Billingsley, Lafayette, LA (US)

(73) Assignee: Halliburton Energy Services, Inc., Duncan, OK (US)

( * ) Notice: Subject to any disclaimer, the term of this patent is extended or adjusted under 35 U.S.C. 154(b) by 112 days.

(21) Appl. No.: 10/334,856

(22) Filed: Dec. 31, 2002

(65) Prior Publication Data

US 2004/0123985 A1 Jul. 1, 2004

(51) Int. Cl.$^7$ .......................... E21B 33/158; C09K 7/06
(52) U.S. Cl. .......................... 175/72; 166/292; 507/140
(58) Field of Search .......................... 175/72; 166/292; 507/140, 910

(56) References Cited

U.S. PATENT DOCUMENTS

| | | |
|---|---|---|
| 3,363,698 A | 1/1968 | Smith et al. |
| 3,774,683 A | 11/1973 | Smith et al. |
| 3,804,058 A | 4/1974 | Messenger |
| 4,473,480 A | 9/1984 | Green et al. |
| 5,295,543 A | 3/1994 | Terry et al. |
| 5,327,968 A | 7/1994 | Onan et al. |
| 5,355,954 A | 10/1994 | Onan et al. |
| 5,358,044 A | 10/1994 | Hale et al. |
| 5,361,842 A | 11/1994 | Hale et al. |
| 5,398,758 A | 3/1995 | Onan et al. |
| 5,399,195 A | 3/1995 | Hansen et al. |
| 5,401,719 A * | 3/1995 | DeBeer .................. 507/127 |
| 5,421,409 A | 6/1995 | Mueller et al. |
| 5,439,518 A | 8/1995 | Francis et al. |
| 5,458,195 A | 10/1995 | Totten et al. |
| 5,484,019 A | 1/1996 | Griffith |

(Continued)

FOREIGN PATENT DOCUMENTS

| | | | |
|---|---|---|---|
| EP | 0 802 253 A1 | | 10/1997 |
| WO | WO 91/18077 A1 | | 11/1991 |
| WO | WO 93/11202 A1 | | 6/1993 |
| WO | WO 93/18111 A1 | | 9/1993 |
| WO | WO 96/40599 A1 | | 12/1996 |
| WO | WO 97/22677 A1 | | 6/1997 |
| WO | WO 99/21933 | * | 5/1999 |

OTHER PUBLICATIONS

Baroid Product Sheet for "Diamond Seal", a trademark of Halliburton Energy Services, Inc. (1998, 1999), Halliburton Energy Services, Inc., Houston, Texas.
Baroid Product Sheet for "Steel Seal", a trademark of Halliburton Energy Services, Inc. (1995, 1999), Halliburton Energy Services, Inc., Houston, Texas.
Baroid Product Sheet for "Steel Seal Fine", a trademark of Halliburton Energy Services, Inc. (2000), Halliburton Energy Services Inc., Houston, Texas.
Jerry Alleman, Bobby Owen, Freddie Comay, and Donald J. Weintritt, Multi–Functional Solid Lubricant Reduces Friction / Prevents Mud Loss, World Oil 87–90 (Sep. 1995).

*Primary Examiner*—William Neuder
(74) *Attorney, Agent, or Firm*—Craig W. Roddy; Karen B. Tripp

(57) ABSTRACT

A method is provided for reducing loss of drilling fluid and for stabilizing a wellbore during drilling through depleted sands in a subterranean formation comprising depleted sands. The method comprises introducing into said wellbore and into said depleted sands an aqueous fluid comprising silicate or siliconate and resilient graphitic carbon in an amount effective at substantially plugging pores in said depleted sands.

20 Claims, 1 Drawing Sheet

U.S. PATENT DOCUMENTS

| | | |
|---|---|---|
| 5,501,277 A | 3/1996 | Onan et al. |
| 5,569,324 A | 10/1996 | Totten et al. |
| 5,580,379 A | 12/1996 | Cowan |
| 5,585,333 A | 12/1996 | Dahl et al. |
| 5,711,383 A | 1/1998 | Terry et al. |
| 5,716,910 A | 2/1998 | Totten et al. |
| 5,807,810 A | 9/1998 | Blezaard et al. |
| 5,820,670 A | 10/1998 | Chatterji et al. |
| 5,826,669 A * | 10/1998 | Zaleski et al. ................. 175/72 |
| 5,851,960 A | 12/1998 | Totten et al. |
| 6,016,872 A | 1/2000 | Davis |
| 2004/0023815 A1 * | 2/2004 | Burts ......................... 507/200 |

* cited by examiner

METHOD FOR DRILLING DEPLETED SANDS WITH MINIMAL DRILLING FLUID LOSS

BACKGROUND OF THE INVENTION

1. Field of the Invention

The present invention relates to methods and compositions for drilling wellbores in subterranean formations using aqueous based drilling fluids. More particularly, the present invention relates to methods for drilling depleted sands, especially depleted sands having several hundred pounds of overbalance pressure per square inch of subterranean formation, and methods for treating such sands to reduce loss of drilling fluid during such drilling.

2. Description of Relevant Art

A drilling fluid or mud is a specially designed fluid that is circulated through a wellbore as the wellbore is being drilled to facilitate the drilling operation. The various functions of a drilling fluid include removing drill cuttings from the wellbore, cooling and lubricating the drillbit, aiding in support of the drill pipe and drill bit, and providing a hydrostatic head to maintain integrity of the wellbore walls and to prevent wellbore blowouts. Specific drilling fluid systems are selected to optimize a drilling operation in accordance with the characteristics of a particular geological formation. Because of the diversity of geological formations encountered in the oil and gas industry, drilling fluids usually are custom-blended to provide the specific rheology and other properties required for each situation. Generally, drilling fluid systems are complex compositions of liquids (i.e., water, petroleum oil, or synthetic oil or other synthetic fluid), dissolved inorganic and/or organic additives, and suspended, finely divided solids of various types.

Formation damage due to invasion by drilling fluids is a well known problem in drilling. Invasion of drilling fluids into the formation is caused by the differential pressure of the hydrostatic column which is generally greater than the formation pressure, especially in low pressure or depleted zones. Invasion is also caused or allowed by openings in the rock and the ability of fluids to move through the rock—the porosity and permeability of the zone. When drilling depleted sands under an overbalance condition, which may be several hundreds of pounds per square inch, mud pressure will penetrate progressively into the formation unless there is an effective flow barrier present at the wellbore wall. Horizontal drilling may also drill across highly fractured or permeable, low pressure or depleted zones, which increases the probability of the drill pipe getting stuck due to lying on the low side of the borehole. The exposure of numerous fractures or openings having low formation pressures has increased the problems of lost circulation and formation invasion.

Filtrate control mechanisms have long been used to control the movement of drilling fluids and filtrate into and through the formation openings. Such mechanisms traditionally involve adding particles to the drilling fluid, which are deposited onto the wellbore wall during circulation of the drilling fluid when drilling. These particles are commonly bentonite, starch, lignins, polymers, barite, drilled solids and various combinations of these. The particles form a filter cake on the borehole wall which provides a low permeable barrier. Such traditional solutions, however, have not been sufficient for eliminating or significantly reducing lost circulation and formation invasion of drilling fluids when drilling depleted sands, particularly depleted sands with overburden pressure amounting to several hundred pounds per square inch, or across highly fractured or permeable, low pressure or depleted zones. There continues to be a need for improved methods for drilling depleted sands.

SUMMARY OF THE INVENTION

The present invention provides a method for substantially or effectively plugging pores of depleted sands in a subterranean formation comprising such depleted sands, including offshore formations comprising depleted sands with overburden pressure amounting to several hundred pounds per square inch. The method affords drilling the depleted sands with minimal loss of drilling fluid and significantly reduced formation permeability near the wellbore.

In the method of the invention, a well treatment is provided that uses a fluid which combines the chemical plugging ability of silicate or siliconate fluids with the physical plugging ability of deformable materials, preferably inert, such as resilient graphitic carbon. The deformable material may be added to the drilling fluid and used during drilling or may be applied additionally or alternatively as a separate sweep. The pH of the fluid is preferably maintained at an amount or level that facilitates or promotes precipitation of silicates.

DETAILED DESCRIPTION OF PREFERRED EMBODIMENT

Figure 1:
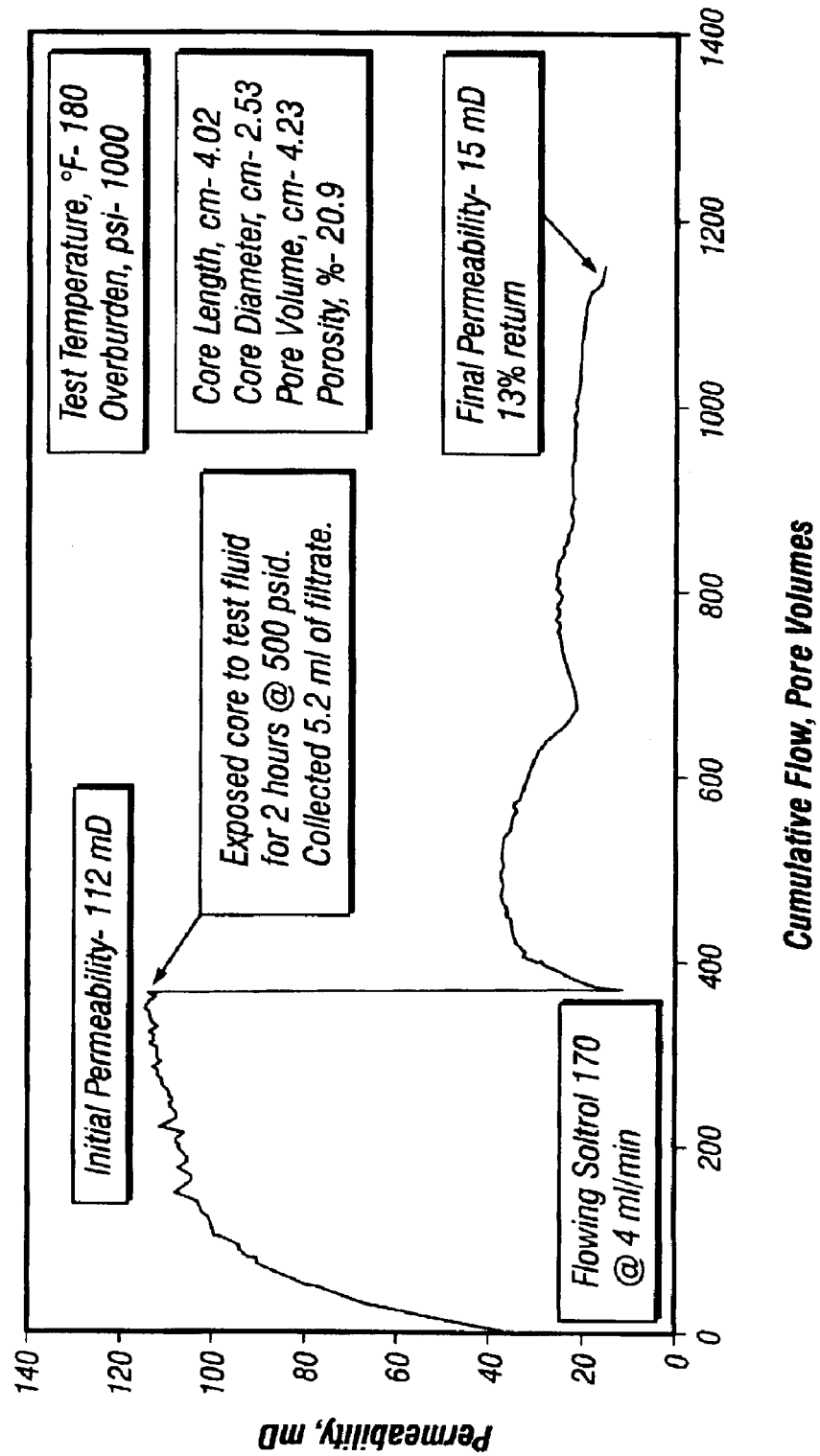
FIG. 1 is a graph of experimental results showing reduction in formation permeability achievable with silicate or siliconate fluids for use in the method of the invention.

An improved method for drilling depleted sands is provided with minimal loss of drilling fluid and significantly reduced formation permeability near the wellbore. Such reduced permeability is desirable in drilling depleted sands not only to minimize loss of drilling fluid, but also to stabilize the wellbore and formation surrounding the wellbore to avoid a washout of the well.

In the method, a well treatment is provided that uses a fluid which combines the chemical plugging ability of silicate fluids with the physical plugging ability of resilient graphitic carbon. Preferred sources of silicate and siliconate species are sodium and potassium silicate, silicic acid, silica flour with sodium and potassium hydroxide, potassium methylsiliconate, sodium methyl siliconate, and combinations of these compositions or compounds. Preferred resilient graphitic carbon comprises about 50 to about 80 volume percent graphite that has been subjected to high thermal treatment resulting in macroscopic particles of high purity and ordered crystalline structure that are resilient to a degree of up to about 150 percent at 10,000 pounds per square inch. Resilient graphitic carbon is discussed further in an article entitled, "Multi-functional solid lubricant reduces friction/prevents mud loss" from the September 1998 issue of WORLD OIL magazine at pages 87–90, incorporated herein by reference. Commercially available resilient graphitic carbon suitable for use in the present invention is STEELSEAL®, available from Halliburton Energy Services, Inc. in Houston, Tex.

Combining graphite and a silicate such as phlogopite has been previously proposed in combination with a silicone such as dimethylpolysiloxane as a drilling mud additive in U.S. Pat. No. 5,401,719, issued Mar. 28, 1995 to DeBeer.

This combination, however, is to provide a lubricious drilling mud, not a treatment fluid for plugging depeleted sands. It is well known in the oil and gas industry that drilling fluids should not plug formation zones.

U.S. Pat. No. 5,826,669, issued Oct. 27, 1998 to Zaleski, et al. noted lubricity and other problems with powdered graphite commonly added to drilling fluids and proposed use of resilient graphitic carbon particles as an alternative drilling fluid additive. Again, however, this additive was proposed for use as a lubricant.

International Patent Application No. PCT/US/01/35686 of Fersheed K. Mody and Kenneth W. Pober and others, incorporated herein by reference, teaches a method and composition for drilling a wellbore in subterranean argillaceous formations and for stabilizing a wellbore during such drilling by increasing the osmotic outflow of water from the formation into the wellbore. Further, the method and composition of that invention reduce the flow of salts between said formation and the wellbore. A compound that forms a membrane on the wellbore wall is added to the drilling fluid. The compound is soluble in the drilling fluid, at least at the pH at which the compound is added to the drilling fluid or exists in the drilling fluid, but is insoluble in the water in the pores (pore water) of said argillaceous formations, or at least at the pH of the water in such pores. The compound has an acid-base dissociation constant in the range of about 8 to about 12 and is more soluble at or above about pH 9 than at about pH 7. The compound undergoes a pH-induced phase transition between about pH 7 and about pH 13, and shows a change in degree of ionisation at about pH 7 to about pH 13. The membrane preferably has an efficiency greater than about 15% and more preferably greater than about 60%. The composition of that invention is an aqueous based drilling fluid comprising the membrane-forming compound employed in the method of the invention. Such compounds may be selected, for example, from the group comprising: phenols; long chain fatty acids that can self-assemble in their ionised state; silicic acid; methyl silanetriol; 2-naphthol; tetramethylammonium laurate; tetramethylammonium oleate; potassium methyl siliconate; sodium methyl siliconate; and silicate wherein said silicate was manufactured by dissolution of amorphous silica Other compounds having the ability to form a membrane on the wellbore wall and be soluble in the drilling fluid but insoluble in the pore water of argillaceous formations may alternatively be used.

U.S. Pat. No. 6,152,227, issued Nov. 28, 2000 to Jimmie B. Lawson and Donald L. Whitfill, incorporated herein by reference, teaches drilling fluids designed for drilling and cementing through shallow water flows and unconsolidated formations using hollow microspheres to increase the volume of the drilling fluid without adding too much weight to the drilling fluid. The drilling fluid also employs an admixture of silicate, high surface area fibrous material, deformable graphite particles, and an activatable cementitious material to stabilize unconsolidated formations and form a tough filter cake that will bond with cement casing.

In the method of the present invention, the silicate and resilient graphitic carbon system go further than merely forming a tough filtercake on the wellbore wall during drilling depleted sands. The system is used to effectively plug the depleted sands, a phenomenon not usually desired in drilling fluids when drilling wellbores in most formations, but quite effective in the present invention.

According to the method of the invention, an aqueous-based silicate (or siliconate) fluid comprising or containing resilient graphitic carbon, wherein the silicate and the graphitic carbon are in effective amounts for plugging depleted sands, such as BAROMEGA™ fluid having added thereto STEELSEAL® (both available from Halliburton Energy Services, Inc. in Houston, Tex.), is employed in the wellbore and allowed to effectively plug at least a substantial portion of said sands, during drilling a wellbore through said sands. Drilling may be continuous during said treatment or a sweep of the treatment fluid may be conducted in addition to or in association with the routine drilling operations to enhance plugging of the depleted sands. Preferably, such sweep is conducted periodically, most preferably when zones of depleted sands are being encountered during drilling of the wellbore.

For a sweep, treatment fluids comprising higher concentrations of silicate (preferably in the range of about 12% to about 20%) or a lower pH (preferably in the range of about 8 to about 10 are used. The lower pH enhances the formation of silica gel particles in the drilling fluid contained in the formation pores. In addition to a silicate compound or composition or material, the sweep fluid might comprise citric acid or calcium chloride solutions. Calcium chloride provides the added benefit of divalent calcium to form a precipitate, further plugging the formation pores. Magnesium could alternatively or additionally be used for this purpose, or sea water treated with an acid to lower the pH.

The pH of the system is adjusted (lowered) to change the silicate species in solution to achieve the desired degree of plugging. Lowering the pH until colloidal silica gel forms effects the most plugging. See Table 1 below:

TABLE 1

| Sodium Silicate Concentration (%) | Original Permeability Kw1 (md) | Return Permeability Kw2 (md) | Percent of Original Permeability | Percent of Permeability Change (Plugging) |
|---|---|---|---|---|
| 2 | 6617 | 3901 | 59 | 41 |
| 8 | 6077 | 1510 | 25 | 75 |
| 12 | 5179 | 1064 | 21 | 79 |
| 16 | 6116 | 876 | 14 | 86 |
| 20 | 5508 | 476 | 9 | 91 |

Table 2 shows the plugging characteristics of different materials on a filter disk as denoted by spurt and total fluid loss. The filter disk had very large pore sizes, as might be encountered in a depleted sand in a marine environment. The comparison indicates superior plugging ability of a commercially available resilient graphitic carbon, STEELSEAL®, available from Halliburton Energy Services, Inc. in Houston, Tex., when compared to other materials tested. The STEELSEAL® samples showed very low spurt and total fluid loss on the filter disk. Sample 1 incorporated fiber materials only (premium seal and fiber liner). Sample 2 incorporated the same fiber materials used in Sample 1 but with one-half of the treating weight replaced with a rubber material (pipe rubber). Sample 3 replaced the rubber material in Sample 2 with resilient graphitic carbon (STEELSEAL®).

TABLE 2

| | Sample No. | | |
|---|---|---|---|
| | 1 | 2 | 3 |
| Mud, barrels (bbls) | 1 | 1 | 1 |
| Premium Seal, pounds per barrel (ppb) | 12 | 6 | 6 |

TABLE 2-continued

|  | Sample No. | | |
| --- | --- | --- | --- |
|  | 1 | 2 | 3 |
| Fiber Liner, ppb | 12 | 6 | 6 |
| Pipe Rubber, ppb |  | 12 |  |
| STEELSEAL ®, ppb |  |  | 12 |
| PPA Temp, F | 200 | 200 | 200 |
| PPA Pressure, psi | 1500 | 1500 | 1500 |
| PPA disk size, microns | 190 | 190 | 190 |
| Spurt | 30.0 | 34.0 | 4.0 |
| Filtrate, ml | 30.0 | 34.0 | 4.0 |
| Total Filtrate, ml | 36.0 | 44.0 | 6.2 |

Resilient graphitic carbon has the advantageous ability to conform to pore throats and thus provides more effective seals than might be achievable with ordinary graphite. Other deformable materials could be substituted for resilient graphitic carbon in the invention. Examples of suitable deformable materials include pipe rubber and thermoplastics for example. The deformable material should preferably be inert to both the drilling fluid and to the subterranean formation.

Experimental

An example laboratory experiment further demonstrates the effectiveness of the present invention. A 12.0 lb/gal. test fluid was formulated with the composition and properties shown in Table 3 below:

TABLE 3

| Silicic Acid Base, bbl | 0.92 |
| --- | --- |
| BARAZAN ® D PLUS, lb | 0.5 |
| N-DRIL ® HT PLUS, lb | 5.0 |
| REV DUST ®, lb | 20 |
| BAROID ®, lb | 117 |
| Rolled @ 150° F., hr | 16 |
| Stirred, min | 10 |
| Formulated density, lb/gal | 12.0 |
| Temperature, ° F. | 120 |
| Plastic Viscosity, cP | 16 |
| Yield Point, lb/100 ft² (20–25) | 29 |
| 10 Sec gel, lb/100 ft² | 8 |
| 10 Min gel, lb/100 ft² | 11 |
| PH | 10.9 |
| FANN 35A Dial Readings | |
| 600 rpm | 61 |
| 300 rpm | 45 |
| 200 rpm | 39 |
| 100 rpm | 29 |
| 6 rpm | 10 |
| 3 rpm | 9 |

All trademarked products cited herein are commercially available from Halliburton Energy Services, Inc. in Houston, Tex. unless indicated specifically to the contrary.

The Silicic Acid Base was formulated with the composition shown in Table 4:

TABLE 4

| Water, bbl | 0.8945 |
| --- | --- |
| NaCl, lb | 78.84 |
| Silicic Acid, lb | 17.24 |
| NaOH, lb | 11.34 |

For the test, a Berea sandstone core was saturated with synthetic formation water having the composition set forth in Table 5:

TABLE 5

| Component | ppm |
| --- | --- |
| Sodium | 10,440 |
| Potassium | 375 |
| Magnesium | 1,270 |
| Calcium | 410 |
| Chloride | 18,970 |
| Sulfate | 2,720 |

The saturated core (1 inch diameter) was inserted into a containment sleeve of a Manual Return Permeameter. The pressure chamber was sealed and the temperature was maintained at approximately 180° F., with 1000-psi overburden pressure. Soltrol 170, filtered to 0.45 micron, was produced through the core at 4.0 ml/min against approximately 30 psi backpressure and initial permeability calculated using Darcy's Law for linear flow:

$$K = \frac{(Q)(L)(15700)}{(60 \, \Delta \tilde{n} \, A)}$$

Where:
K=permeability in mD
Q=flow rate, cc/sec
ĩ=Viscosity of Soltrol 170@180° F.=1.2 cP
L=Length of core plug, cm
14700=conversion factor (atm to psi and Darcy to millidarcy)
60=conversion factor from cc/sec to cc/min
Δñ=pressure drop, psi
A=cross sectional area of core plug, cm²

The test fluid was introduced into the core and the core was exposed to the test fluid for two hours at 500 psid. Any filtrate was collected. The test fluid was then displaced from the test chamber by pumping Soltrol 170 at 10 ml/min for 15 minutes. After the test fluid was displaced, production of Soltrol 170 was resumed using the same procedure as initially. After differential pressure stabilized, the flow of Soltrol 170 was stopped and the final permeability was calculated using the formula above and percent return was determined (final permeability/initial permeability) (100). The results, shown in FIG. 1, indicated a dramatic reduction in initial permeability—a 13% return.

The foregoing description of the invention is intended to be a description of preferred embodiments. Various changes in the details of the described fluids and methods of use can be made without departing from the intended scope of this invention as defined by the appended claims.

What is claimed is:

1. A method of drilling a wellbore through depleted sands in a subterranean formation comprising such depleted sands, said method comprising: introducing into said wellbore a treatment fluid comprising a silica species selected from the group consisting of silicate, siliconate and mixtures thereof, and a deformable material; and allowing said fluid to enter said depleted sands effectively plugging same with said silica species and said deformable material.

2. The method of claim 1 wherein said fluid is introduced into said wellbore as a treatment during drilling of same wellbore.

3. The method of claim 2 wherein said fluid is added to aqueous drilling fluid.

4. The method of claim 2 wherein said fluid is applied as a sweep.

5. The method of claim 1 wherein said silicate or siliconate is formulated from compositions selected from the group comprising sodium and potassium silicate, silicic acid, silica flour with sodium or potassium hydroxide, potassium methylsiliconate, sodium methyl siliconate, and combinations thereof.

6. The method of claim 1 wherein said deformable material comprises resilient graphitic carbon.

7. The method of claim 1 wherein the pH of said fluid is within the range of about 10 to about 13.

8. The method of claim 1 wherein said fluid further comprises calcium chloride.

9. The method of claim 1 wherein said fluid further comprises citric acid.

10. The method of claim 4 wherein said fluid further comprises magnesium.

11. The method of claim 7 wherein said fluid further comprises sea water.

12. A method for plugging depleted sands in a subterranean formation, said method comprising introducing into said sands a silica species selected from the group consisting of silicate, siliconate, and mixtures thereof, and a deformable material, in an amount sufficient to effect said plugging.

13. The method of claim 12 wherein said deformable material comprises resilient graphitic carbon.

14. A method for reducing lost circulation in depleted sands, said method comprising introducing into said sands silicic acid and a deformable material at a pH that effects formation of silicate precipitates in said formation and substantial plugging of said sands by said precipitates and deformable material.

15. The method of claim 14 wherein said deformable material comprises resilient graphitic carbon.

16. A method for stabilizing a wellbore during drilling of said wellbore through depleted sands in a subterranean formation comprising depleted sands, said method comprising introducing in said wellbore a treatment fluid comprising silicate and a deformable material at a pH such that chemical plugging and physical plugging of said depleted sands occurs.

17. The method of claim 16 wherein said deformable material comprises resilient graphitic carbon.

18. A treatment method to stabilize a wellbore and reduce lost circulation during drilling through depleted sands by plugging said depleted sands, said method comprising applying in said wellbore penetrating said depleted sands a sweep of a chemical precipitating species and a physical plugger at a pH at which said chemical precipitating species precipitates to plug said depleted sands along with said physical plugger.

19. The method of claim 18 wherein said chemical precipitating species is silicate, siliconate or mixtures thereof.

20. The method of claim 18 wherein said physical plugger is resilient graphitic carbon.

* * * * *